(12) United States Patent
Lin et al.

(10) Patent No.: US 8,416,252 B2
(45) Date of Patent: Apr. 9, 2013

(54) IMAGE PROCESSING APPARATUS AND MEMORY ACCESS METHOD THEREOF

(75) Inventors: Po-Jung Lin, Hsinchu County (TW);
Da-Ming Chang, Kaohsiung (TW);
Chien-Fa Huang, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 195 days.

(21) Appl. No.: 13/110,942

(22) Filed: May 19, 2011

(65) Prior Publication Data

US 2012/0218279 A1 Aug. 30, 2012

(30) Foreign Application Priority Data

Feb. 25, 2011 (TW) .............................. 100106507 A (51) Int. Cl.
*G09G 5/39* (2006.01)
*G06F 13/00* (2006.01)
*G06F 9/34* (2006.01)

(52) U.S. Cl. .......................... 345/531; 345/536; 711/201
(58) Field of Classification Search .................... 345/561
See application file for complete search history.

(56) References Cited

U.S. PATENT DOCUMENTS

| | | | | |
|---|---|---|---|---|
| 6,907,509 | B2 * | 6/2005 | Hall et al. ...................... | 711/201 |
| 7,719,442 | B2 * | 5/2010 | Liu et al. .......................... | 341/51 |
| 2010/0302418 | A1 * | 12/2010 | Adams et al. .................. | 348/281 |
| 2012/0002901 | A1 * | 1/2012 | Zhang et al. ................... | 382/300 |
| 2012/0033736 | A1 * | 2/2012 | Sato .......................... | 375/240.16 |

\* cited by examiner

*Primary Examiner* — Kee M Tung
*Assistant Examiner* — Vu Nguyen
(74) *Attorney, Agent, or Firm* — Jianq Chyun IP Office (57) ABSTRACT

A memory access method for processing images includes reading an image data from a main memory. The image data has display rows. Inner memories are configured to be memory blocks arranged in an order of data storage. First pixel data in an $i^{th}$ display row are written into the memory blocks in the order of data storage, and N dummy data are written into the memory blocks in the order of data storage to form an isolated block. M dummy data are written into the memory blocks after the isolated block in the order of data storage to form a first shifted block. Second pixel data in an $(i+1)^{th}$ display row are written into the memory blocks after the first shifted block in the order of data storage, and O dummy data are written into the memory blocks in the order of data storage to form a second shifted block.

15 Claims, 7 Drawing Sheets

|  | BANK1 | BANK2 | BANK3 | BANK4 |
|---|---|---|---|---|
| ADD1 | P0_0 | P0_1 | P0_2 | P0_3 |
| ADD2 | P0_4 | P0_5 | P0_6 | P0_7 |
|  | ⋮ | ⋮ | ⋮ | ⋮ |
| ADD64 | P0_252 | P0_253 | P0_254 | P0_255 |
| ADD65 | X | X | X | X |
| ADD66 | P1_0 | P1_1 | P1_2 | P1_3 |
|  | ⋮ | ⋮ | ⋮ | ⋮ |
| ADD129 | P1_252 | P1_253 | P1_254 | P1_255 |
| ADD130 | X | X | X | X |
| ADD131 | X | P2_0 | P2_1 | P2_2 |
| ADD132 | P2_3 | P2_4 | P2_5 | P2_6 |
|  | ⋮ | ⋮ | ⋮ | ⋮ |
| ADD195 | P2_255 | X | X | X |
| ADD196 | X | P3_0 | P3_1 | P3_2 |
|  | ⋮ | ⋮ | ⋮ | ⋮ |
| ADD260 | P3_255 | X | X | X |

FIG. 5A

| X= | 0 | 1 | 2 | 3 | 4 | 5 | 6 | 7 | 8 | 9 | 10 | 11 |
|---|---|---|---|---|---|---|---|---|---|---|---|---|
| Y=0 | R0 | Gr0 | R1 | Gr1 | R2 | Gr2 | R3 | Gr3 | R4 | Gr4 | R5 | Gr5 |
| 1 | Gb0 | B0 | Gb1 | B1 | Gb2 | B2 | Gb3 | B3 | Gb4 | B4 | Gb5 | B5 |
| 2 | R6 | Gr6 | R7 | Gr7 | R8 | Gr8 | R9 | Gr9 | R10 | Gr10 | R11 | Gr11 |
| 3 | Gb6 | B6 | Gb7 | B7 | Gb8 | B8 | Gb9 | B9 | Gb10 | B10 | Gb11 | B11 |
| 4 | R12 | Gr12 | R13 | Gr13 | R14 | Gr14 | R15 | Gr15 | R16 | Gr16 | R17 | Gr17 |
| 5 | Gb12 | B12 | Gb13 | B13 | Gb14 | B14 | Gb15 | B15 | Gb16 | B16 | Gb17 | B17 |
| 6 | R18 | Gr18 | R19 | Gr19 | R20 | Gr20 | R21 | Gr21 | R22 | Gr22 | R23 | Gr23 |
| 7 | Gb18 | B18 | Gb19 | B19 | Gb20 | B20 | Gb21 | B21 | Gb22 | B22 | Gb23 | B23 |

IMAGE PROCESSING APPARATUS AND MEMORY ACCESS METHOD THEREOF

CROSS-REFERENCE TO RELATED APPLICATION

This application claims the priority benefit of Taiwan application serial no. 100106507, filed on Feb. 25, 2011. The entirety of the above-mentioned patent application is hereby incorporated by reference herein and made a part of this specification.

BACKGROUND OF THE INVENTION

1. Field of the Invention

The invention relates to an image processing apparatus and an image processing method thereof. More particularly, the invention relates to an image processing apparatus that performs an interpolation and an image processing method of the image processing apparatus.

2. Description of Related Art

In accordance with the existing image processing technology, interpolation of image data is mainly performed by implementing following steps. Based on the predetermined geometric coordinate, each of the raw image data is transformed and stored in an address of the main memory corresponding to a position of each of the pixel data. The image data in the main memory are read and stored in inner memories. When the interpolation is performed, each address of the image data which are stored in the inner memories and required for performing the interpolation is calculated, and the required image data are read from the inner memories based on the addresses.

Figure 1:
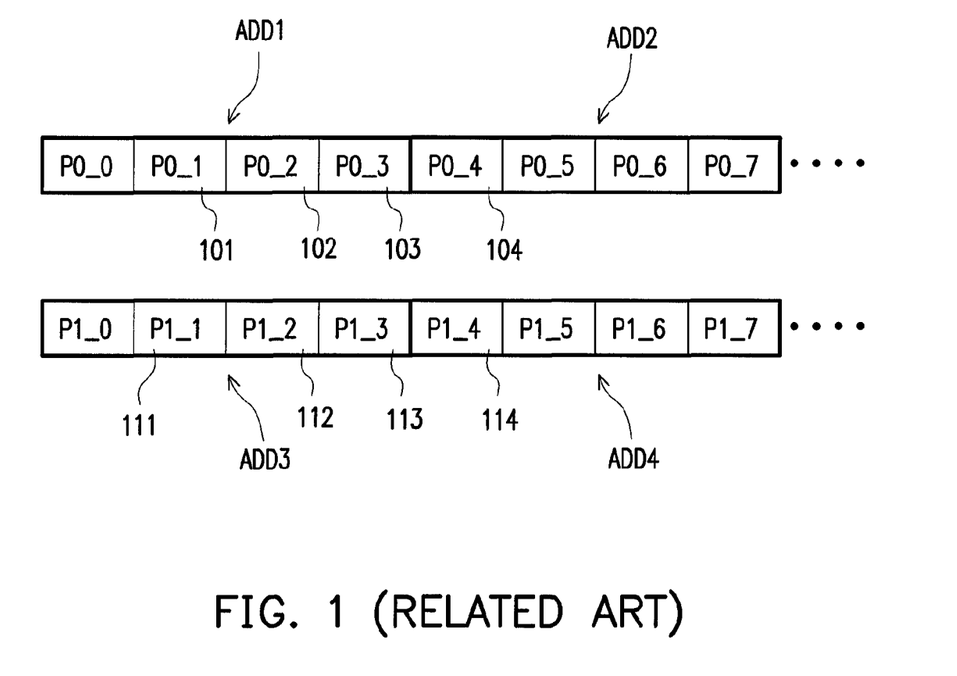
FIG. 1 is a schematic view illustrating image data stored in conventional inner memories.

Please refer to FIG. 1. Specifically, FIG. 1 is a schematic view illustrating image data stored in conventional inner memories. The inner memories have a plurality of memory blocks 101~114 for consecutively storing a plurality of image data P0_0~P1_7. In the image data, for instance, P0_0 denotes the pixel data in the first column and the first row, P1_0 denotes the pixel data in the first column and the second row, and so on. When the pixel data required for performing the interpolation refer to the pixel data P0_1, P0_2, P1_1, and P1_2, the inner memories need to be at least read twice for retrieving the pixel data P0_1, P0_2, P1_1, and P1_2 because the pixel data P0_1 and P0_2 and the pixel data P1_1 and P1_2 are respectively stored in the addresses ADD1 and ADD2 in the inner memories. Further, when the pixel data required for performing the interpolation refer to the pixel data P0_3, P0_4, P1_3, and P1_4, the inner memories need to be read four times for retrieving the pixel data P0_3, P0_4, P1_3, and P1_4 stored in the addresses ADD1, ADD2, ADD3, and ADD4 in the inner memories, which significantly deteriorates the image processing efficiency.

SUMMARY OF THE INVENTION

The invention is directed to several memory access methods for processing images. When an interpolation of an image data is performed, the required bandwidth of data retrieved from inner memories can be effectively reduced.

The invention is further directed to several image processing apparatuses. When an interpolation of an image data is performed, the required bandwidth of data retrieved from inner memories can be effectively reduced.

In an embodiment of the invention, a memory access method for processing images at least includes following steps. An image data having a plurality of display rows is read from a main memory. A plurality of inner memories are configured to be a plurality of memory blocks arranged in an order of data storage. A plurality of first pixel data in an $i^{th}$ display row of the display rows are written into the memory blocks in the order of data storage, and N dummy data are written into the memory blocks in the order of data storage to form an isolated block. M dummy data are written into the memory blocks after the isolated block in the order of data storage to form a first shifted block. A plurality of second pixel data in an $(i+1)^{th}$ display row of the display rows are written into the memory blocks after the first shifted block in the order of data storage, and O dummy data are written into the memory blocks in the order of data storage to form a second shifted block.

In an embodiment of the invention, another memory access method for processing images at least includes following steps. An image data having a plurality of display rows is read from a main memory. A plurality of inner memories are configured to be a plurality of memory blocks arranged in an order of data storage. A plurality of first and second pixel data in an $i^{th}$ display row and an $(i+1)^{th}$ display row of the display rows are written into the memory blocks in the order of data storage. N dummy data are inserted between the first and second pixel data in the $i^{th}$ display row and the $(i+1)^{th}$ display row. N dummy data are written into the memory blocks after the second pixel data in the order of data storage to form an isolated block. A plurality of third and fourth pixel data in an $(i+3)^{th}$ display row and an $(i+4)^{th}$ display row of the display rows are written into the memory blocks in the order of data storage. Here, M dummy data are inserted between the isolated block and the third pixel data, (M+O) dummy data are inserted between the third pixel data and the fourth pixel data to form a shifted block, and O dummy data are written into the memory blocks after the shifted block in the order of data storage.

In an embodiment of the invention, an image processing apparatus that includes a bus arbiter, a plurality of inner memories, a main memory controller, and a controller is provided. The inner memories are coupled to the bus arbiter. The main memory controller is coupled between the bus arbiter and a main memory. The controller is coupled to the bus arbiter and reads an image data from the main memory through the bus arbiter. Here, the image data has a plurality of display rows. The controller configures the inner memories to be a plurality of memory blocks arranged in an order of data storage. The controller writes a plurality of first pixel data in an $i^{th}$ display row of the display rows into the memory blocks in the order of data storage, and the controller writes N dummy data into the memory blocks in the order of data storage to form an isolated block. The controller writes M dummy data into the memory blocks after the isolated block in the order of data storage to form a first shifted block, writes a plurality of second pixel data in an $(i+1)^{th}$ display row of the display rows into the memory blocks after the first shifted block in the order of data storage, and writes O dummy data into the memory blocks in the order of data storage to form a second shifted block.

In an embodiment of the invention, another image processing apparatus that includes a bus arbiter, a plurality of inner memories, a main memory controller, and a controller is provided. The inner memories are coupled to the bus arbiter. The main memory controller is coupled between the bus arbiter and a main memory. The controller is coupled to the bus arbiter and reads an image data from the main memory through the bus arbiter. Here, the image data has a plurality of display rows. The controller configures a plurality of inner memories to be a plurality of memory blocks arranged in an order of data storage. The controller writes a plurality of first and second pixel data respectively in an $i^{th}$ display row and an $(i+1)^{th}$ display row of the display rows into the memory blocks in the order of data storage. The controller also inserts N dummy data between the first and second pixel data in the $i^{th}$ display row and the $(i+1)^{th}$ display row and writes N dummy data into the memory blocks after the second pixel data in the order of data storage to form an isolated block. Besides, the controller writes a plurality of third and fourth pixel data respectively in an $(i+3)^{th}$ display row and an $(i+4)^{th}$ display row of the display rows into the memory blocks in the order of data storage. Here, M dummy data are inserted between the isolated block and the third pixel data, and (M+O) dummy data are inserted between the third pixel data and the fourth pixel data to form a shifted block. In addition, the controller writes O dummy data into the memory blocks after the shifted block in the order of data storage.

Based on the above, the image data is read from the main memory, and the pixel data in different display rows of the image data are respectively written into the inner memories that are configured to be a plurality of memory blocks in different rows. Thereby, the adjacent pixel data required for performing the interpolation of each specific pixel data in the image data can be respectively stored in different inner memories. That is to say, when the interpolation of the specific pixel data is performed, different inner memories can be simultaneously read to obtain sufficient adjacent pixel data for interpolation. As such, the required bandwidth of data in the inner memories can be effectively reduced, and the interpolation can be expeditiously performed.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 2:
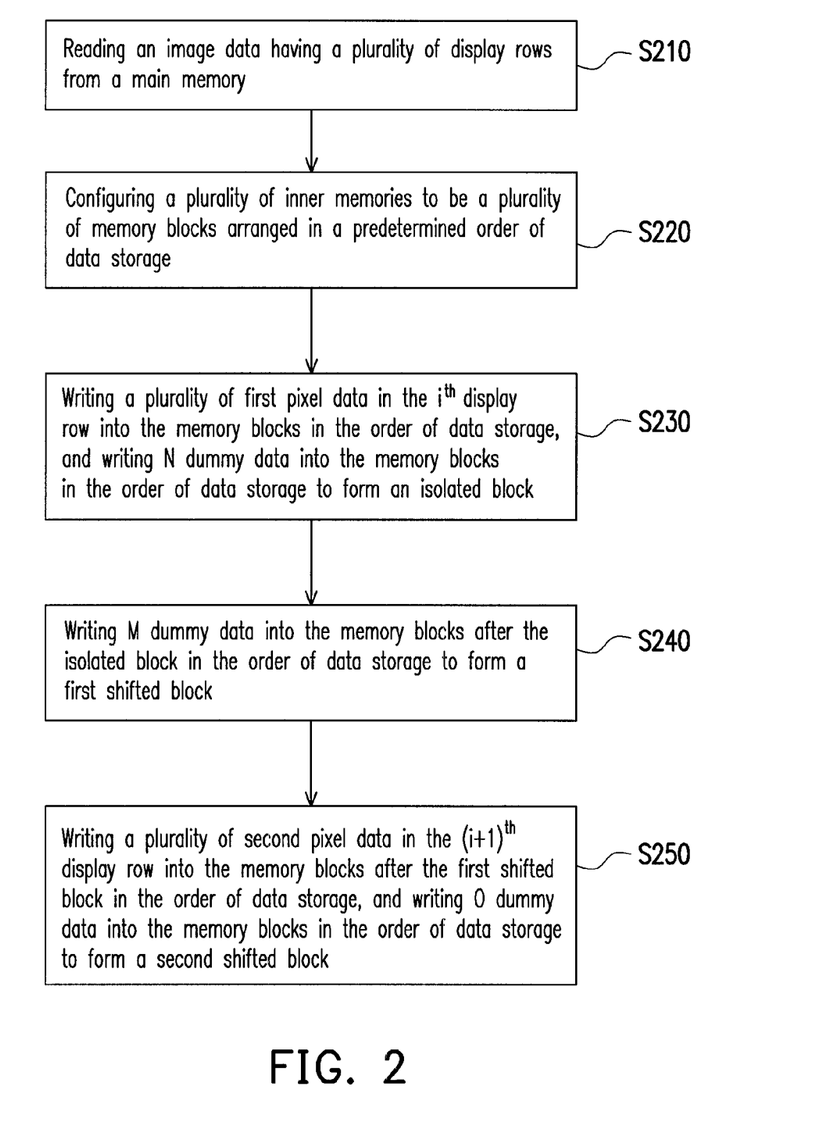
FIG. 2 is a flowchart illustrating a memory access method according to an embodiment of the invention.

Please refer to FIG. 2. Specifically, FIG. 2 is a flowchart illustrating a memory access method according to an embodiment of the invention. The memory access method of this embodiment is suitable for processing images. In particular, according to the memory access method described in this embodiment, when the images are processed, the interpolation is correspondingly performed.

Figure 3:
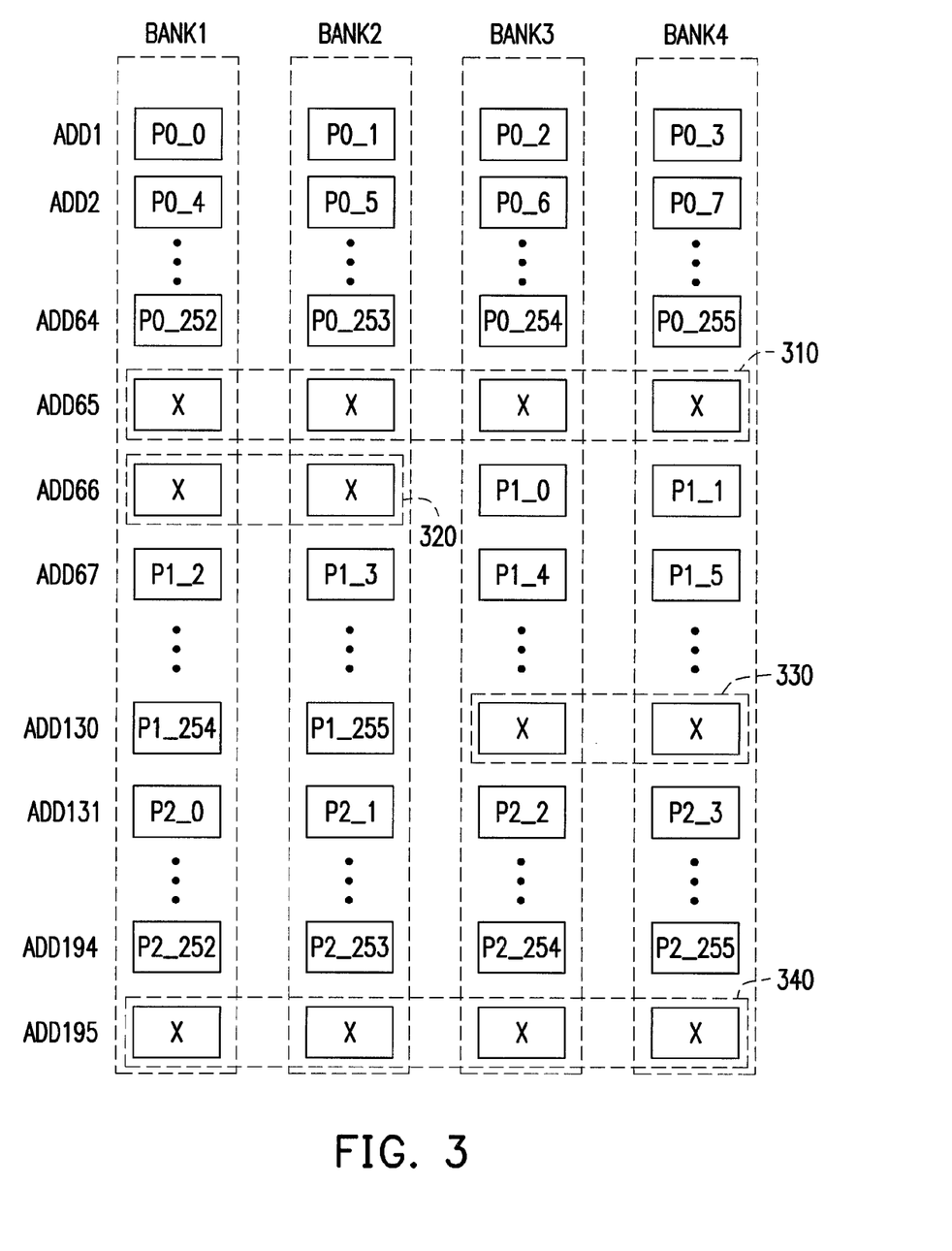
FIG. 3 is a schematic view illustrating pixel data stored in inner memories according to an embodiment of the invention.

First, in step S210, an image data is read from a main memory (not shown), and the image data has a plurality of display rows. In step S220, a plurality of inner memories (not shown) are configured to be a plurality of memory blocks arranged in a predetermined order of data storage. Please refer to FIG. 2 and FIG. 3. Here, FIG. 3 is a schematic view illustrating pixel data stored in the inner memories according to an embodiment of the invention. As shown in FIG. 3, four or more inner memories are configured to be four memory blocks BANK1~BANK4. The priority of storing data in the memory block BANK1 is the highest, the priority of storing data in the memory block BANK2 is the second, the priority of storing data in the memory block BANK3 is the third, and the priority of storing data in the memory block BANK4 is the least.

After that, in step S230, pixel data P0_0~P0_255 in one of the display rows (e.g., the first display row) of the image data which is retrieved from the main memory are written into different addresses in the memory blocks BANK1~BANK4 in the aforesaid order of storing data in the memory blocks BANK1~BANK4, and N dummy data "X" are written into the memory blocks BANK1~BANK4 in the order of storing data in the memory blocks BANK1~BANK4 to form an isolated block 310. According to this embodiment, N is equal to 4. To be more specific, the pixel data P0_0 is stored into the address ADD1 in the memory block BANK1, the pixel data P0_1 is stored into the address ADD1 in the memory block BANK2, and the pixel data P0_2 and P0_3 are sequentially stored into the address ADD1 in the memory blocks BANK3 and BANK4, respectively. Similarly, the pixel data P0_4~P0_7 are respectively stored into the address ADD2 in the memory blocks BANK1~BANK4. The remaining pixel data are stored in the same manner.

When the pixel data P0_0~P0_255 in the same row are all written into the address ADD1~ADD64 in the memory blocks BANK1~BANK4, respectively, the dummy data "X" are written into the address ADD65 in the memory blocks BANK1~BANK4, so as to form the isolated block 310 at the address ADD65 in the memory blocks BANK1~BANK4.

In step S240, M dummy data "X" are written into the memory blocks right after the isolation block 310 to form a shifted block 320. In this embodiment, M is equal to 2. That is to say, the dummy data "X" are written into the address ADD66 in the memory blocks BANK1 and BANK2, so as to form the shifted block 320 at the address ADD66 in the memory blocks BANK1 and BANK2.

The pixel data P1_0~P1_255 in the next display row (e.g., the second display row of the image data in this embodiment) are written into the memory blocks right after the shifted block 320 in the order of data storage. Here, the pixel data P1_0 and P1_1 are respectively written into the address ADD67 in the memory blocks BANK3 and BANK4. Similarly, the pixel data P1_2~P1_255 are respectively written into the addresses ADD67~ADD130 in the memory blocks BANK1~BANK4. In step S250, O dummy data "X" are further written into the address ADD130 in the memory blocks BANK3 and BANK4 right after the pixel data P1_255, so as to form another shifted block 330 at the address ADD130 in the memory blocks BANK3 and BANK4. In this embodiment, O is equal to 2.

M, N, and O described in this embodiment are all positive integers, and N=M+O.

Since the pixel data P2_0~P2_255 (in the third display row of the image data) and the pixel data P0_0~P0_255 (in the first display row of the image data) are arranged in the odd display rows, the pixel data P2_0~P2_255 can be written into the addresses ADD131~ADD194 in the memory blocks BANK1~BANK4 in the same manner as described in step S230. The dummy data "X" are written into the address ADD195 in the memory blocks BANK1~BANK4, so as to form another isolated block 340.

If the image data has other display rows, the steps S230, S240, and S250 described in this embodiment can be performed until all of the pixel data are written into the inner memories or until the inner memories are completely full of the pixel data.

Thereafter, when the interpolation described in the related art and shown in FIG. 1 is to be performed for generating a specific pixel data, and the required adjacent pixel data of the specific pixel data are the pixel data P0_1, P0_2, P1_1, and P1_2, the pixel data P1_2, P0_1, P0_2, and P1_1 can be simultaneously read from different memory blocks BANK1~BANK4 configured by different inner memories because the pixel data P0_1, P0_2, P1_1, and P1_2 of this embodiment are respectively stored into the address ADD1 in the memory block BANK2, the address ADD1 in the memory block BANK3, the address ADD66 in the memory block BANK4, and the address ADD67 in the memory block BANK1.

Besides, when the interpolation is performed, and the required adjacent pixel data are P0_3, P0_4, P1_3, and P1_4, the pixel data P0_4, P1_3, P1_4, and P0_3 can be simultaneously read from the memory blocks BANK1~BANK4 because the pixel data P0_3, P0_4, P1_3, and P1_4 of this embodiment are respectively stored into the address ADD1 in the memory block BANK4, the address ADD2 in the memory block BANK1, the address ADD67 in the memory block BANK2, and the address ADD67 on the memory block BANK3.

From the previous embodiment, it can be learned the memory access method herein can effectively store the adjacent pixel data required for performing the interpolation into different memory blocks. Since different memory blocks are configured by different inner memories, the adjacent pixel data can be read rapidly and simultaneously, so as to improve the image processing efficiency.

In addition, the applicable interpolation described in the embodiment can be bilinear interpolation or any other interpolation that requires the adjacent pixel data. Moreover, the image data in this embodiment is a monochromatic image data.

Figure 4:
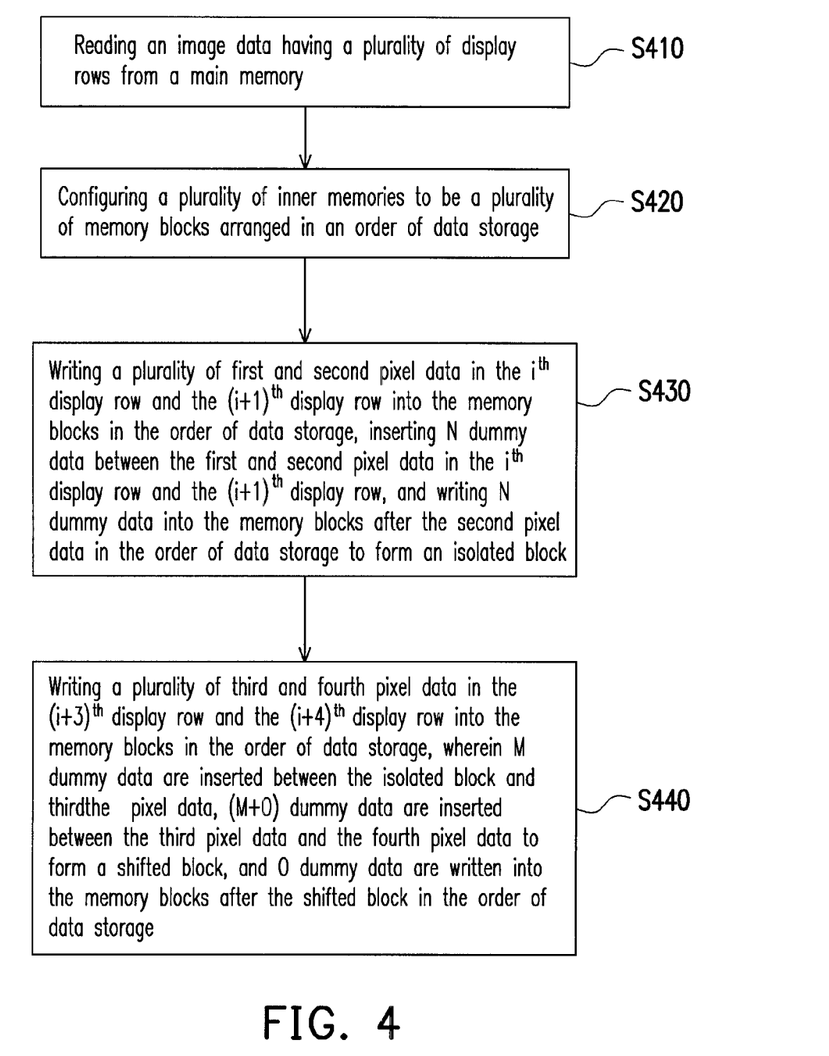
FIG. 4 is a flowchart illustrating a memory access method according to another embodiment of the invention.
Figure 5A:
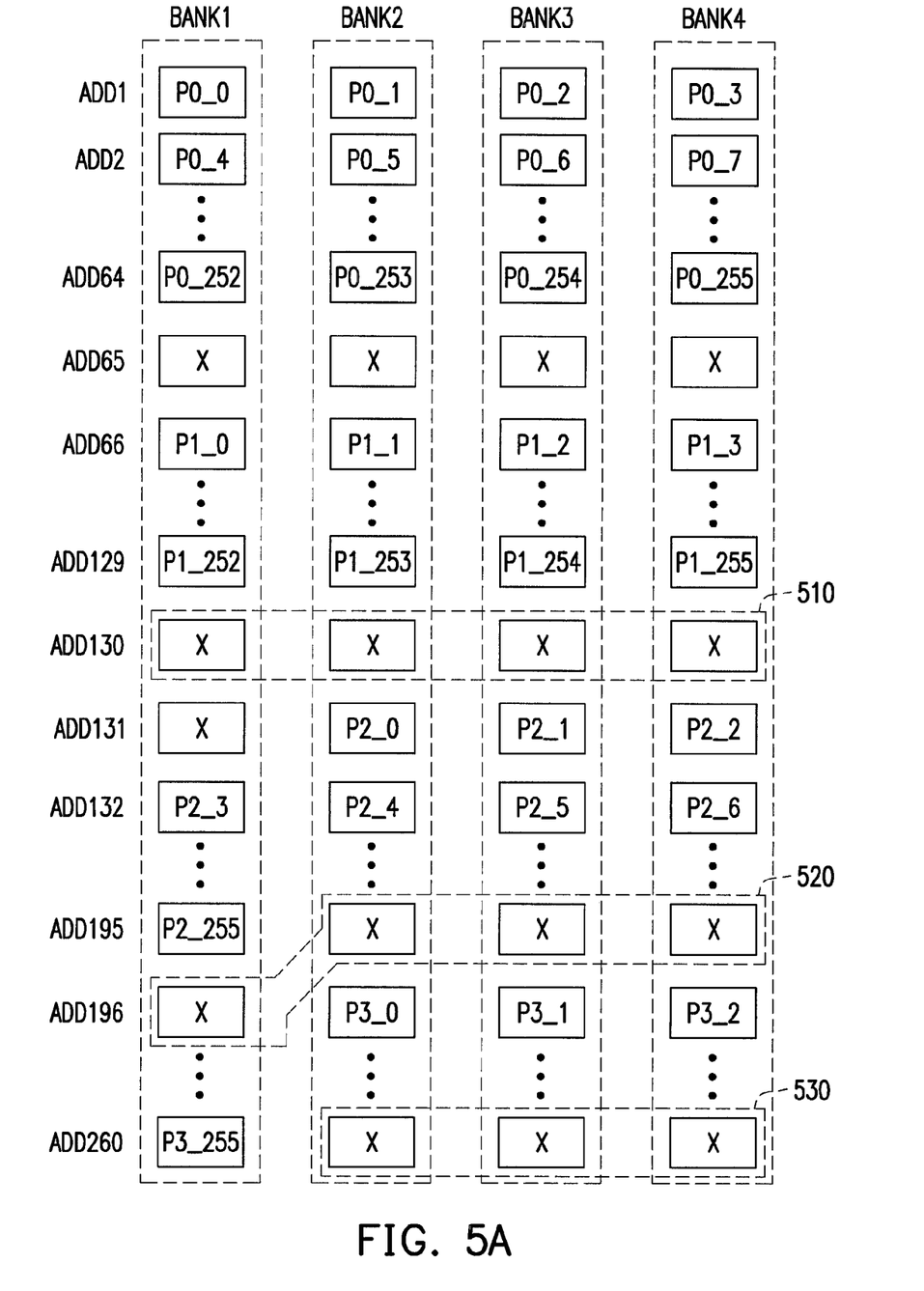
FIG. 5A is a schematic view illustrating pixel data stored in inner memories according to an embodiment of the invention.

Please refer to FIG. 4. Specifically, FIG. 4 is a flowchart illustrating a memory access method according to another embodiment of the invention. First, in step S410, an image data is read from a main memory (not shown), and the image data has a plurality of display rows. In step S420, a plurality of inner memories (not shown) are configured to be a plurality of memory blocks in a predetermined order of data storage. Please refer to FIG. 4 and FIG. 5A. Here, FIG. 5A is a schematic view illustrating pixel data stored in the inner memories according to an embodiment of the invention. As shown in FIG. 5A, four or more inner memories are configured to be four memory blocks BANK1~BANK4. The order of data stored in the memory blocks BANK1~BANK4 is the memory block BANK1, the memory block BANK2, the memory block BANK3, and the memory block BANK4.

Pixel data P0_0~P0_255 and P1_0~P1_255 respectively in two consecutive display rows (e.g., the first and the second display rows of the image data) are written into the memory blocks BANK1~BANK4 in the aforesaid order of storing data in the memory blocks BANK1~BANK4. In step S430, N dummy data "X" are inserted between the pixel data P0_0~P0_255 and P1_0~P1_255 respectively in the first and second display rows, and N dummy data "X" in the second display row are written into the memory blocks after the pixel data P1_0~P1_255 in the order of data storage, so as to form the isolated block 510. In this embodiment, N is equal to 4.

In particular, as indicated in FIG. 5A, the pixel data P0_0~P0_255 in the first display row of the image data are respectively written into the addresses ADD1~ADD64 in the memory blocks BANK1~BANK4, and the pixel data P1_0~P1_255 in the second display row of the image data are respectively written into the addresses ADD66~ADD129 in the memory blocks BANK1~BANK4. N dummy data "X" are inserted into the address ADD65 in the memory blocks BANK1~BANK4 between the pixel data P0_0~P0_255 in the first display row and the pixel data P1_0~P1_255 in the second display row. Besides, dummy data "X" are written into the address ADD130 in the memory blocks BANK1~BANK4 after the pixel data P1_0~P1_255 in the second display row, so as to form the isolated block 510.

After that, the pixel data P2_0~P2_255 in the third display row and the pixel data P3_0~P3_255 in the fourth display row are also written in the order of data storage. Here, M dummy data "X" are inserted between the isolated block 510 and the third pixel data P2_0, and the pixel data P2_0~P2_255 are sequentially written into the memory blocks. In this embodiment, M is equal to 1. After the pixel data P2_255, (M+O) dummy data "X" are inserted to form the shifted block 520. In this embodiment, O is equal to 3. In step S440, the pixel data P3_0~P3_255 are written into the memory blocks after the shifted block 520 in the order of data storage.

To be more specific, as shown in FIG. 5A, the pixel data P2_0~P2_255 in the third display row of the image data are sequentially written into the address ADD131 in the memory block BANK2~the address ADD195 in the memory block BANK1. The dummy data "X" are written into the address ADD131 in the memory block BANK1. The dummy data "X" are also written into the address ADD195 in the memory block BANK1~the address ADD196 in the memory block BANK2, so as to form the shifted block 520. The pixel data P3_0~P3_255 in the fourth display row of the image data are written into the address ADD196 in the memory block BANK2~the address ADD260 in the memory block BANK1. The dummy data "X" are also written into the address ADD260 in the memory block BANK2~the address ADD260 in the memory block BANK4, so as to form another shifted block 530.

Note that the pixel data in every four of the display rows of the image data are cyclically written into the addresses in the memory blocks in this embodiment. Namely, when the image data has the $5^{th}$~$8^{th}$ display rows, the pixel data in the $5^{th}$ and the $6^{th}$ display rows can be sequentially written into the memory blocks BANK1~BANK4 (after the address ADD260) according to the step S430. Besides, according to step S440, the pixel data in the $7^{th}$ and the $8^{th}$ display rows can be sequentially written into the memory blocks BANK1~BANK4.

Figure 5B:
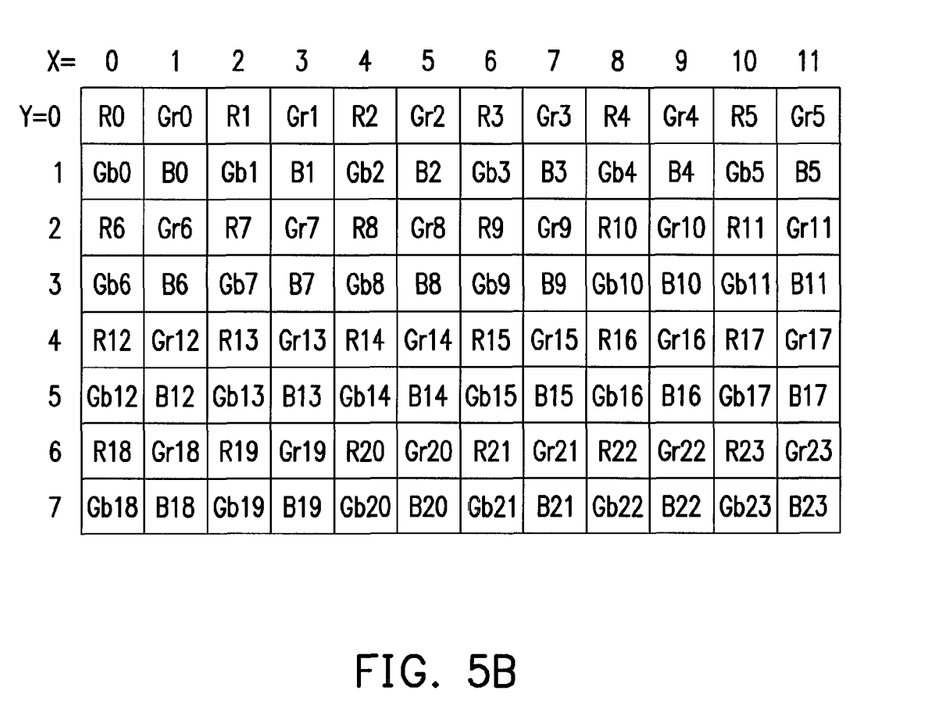
FIG. 5B is a schematic view illustrating the Bayer pattern arrangement of image data.

Please refer to FIG. 5B. Specifically, FIG. 5B is a schematic view illustrating the Bayer pattern arrangement of image data. As shown in FIG. 5, each pixel data in the color image data is categorized into a red data (R), a blue data (B), and green data Gr and Gb. When the image data is arranged in a Bayer-pattern manner, and the interpolation is to be performed, four adjacent pixel data with the same color are required. For instance, the interpolation is performed with the pixel data Gr0, Gr1, Gr6, and Gr7. Here, the pixel data Gr0, Gr1, Gr6, and Gr7 respectively correspond to the pixel data P0_1, P0_3, P2_1, and P2_3 shown in FIG. 5A. It can be learned from FIG. 5A that the pixel data P0_1, P0_3, P2_1, and P2_3 are respectively stored into the address ADD1 in the memory block BANK2, the address ADD 1 in the memory block BANK4, the address ADD 131 in the memory block BANK3, and the address ADD132 in the memory block BANK1 Apparently, the pixel data Gr0, Gr1, Gr6, and Gr7 are respectively stored into different memory blocks BANK2, BANK4, BANK3, and BANK1. Hence, the adjacent pixel data required for performing the interpolation can be simultaneously read, which can effectively improve the image processing efficiency.

Figure 6:
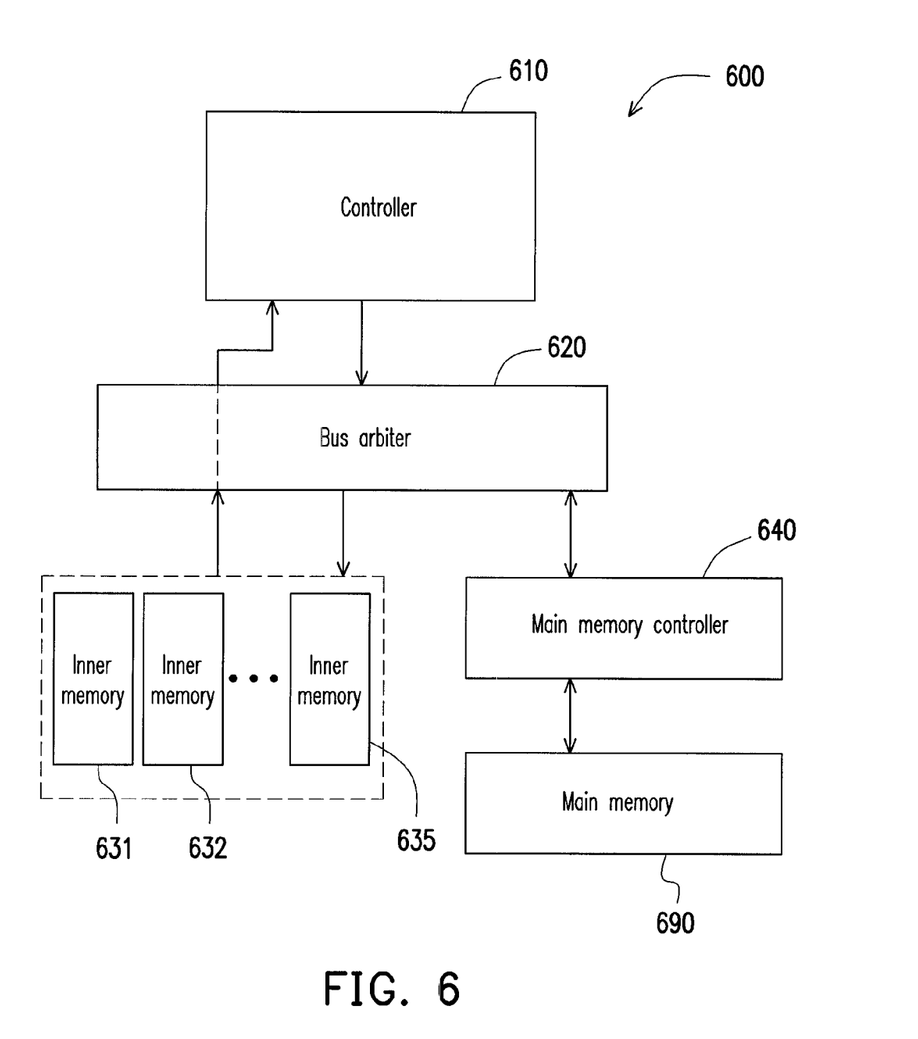
FIG. 6 is a schematic view illustrating an image processing apparatus according to an embodiment of the invention.

FIG. 6 is a schematic view illustrating an image processing apparatus according to an embodiment of the invention. The image processing apparatus 600 includes a bus arbiter 620, inner memories 631~635, a main memory controller 640, and a controller 610. The inner memories 631~635 are coupled to the bus arbiter 620. The main memory controller 640 is coupled between the bus arbiter 620 and a main memory 690, so as to control the main memory 690. The controller 610 is coupled to the bus arbiter 620 for accessing the main memory 690 or the inner memories 631~635. Besides, the controller 610 processes image data stored in the main memory 690, e.g., the controller 610 performs the interpolation.

In this embodiment, the controller 610 performs the interpolation according to the steps shown in FIG. 2 and FIG. 4. The steps are elaborated in the previous embodiments and thus are not reiterated herein. In addition, the main memory 690 of this embodiment can be a dynamic memory, while the inner memories 631~635 can be static memories.

In light of the foregoing, the inner memories are configured to be the memory blocks as described in the embodiments of the invention, and the pixel data in each display row are stored into the memory blocks in the order of storing data in the memory blocks. In addition, by appropriately inserting dummy data between the pixel data in the consecutive display rows, the adjacent pixel data required for performing the interpolation are not overlapped and can be respectively stored into different memory blocks. As such, all of the required adjacent pixel data can be simultaneously read from different memory blocks rapidly, which improves the image processing efficiency.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A memory access method for processing images, the memory access method comprising:
reading an image data from a main memory, the image data having a plurality of display rows;
configuring a plurality of inner memories to be a plurality of memory blocks arranged in an order of data storage;
writing a plurality of first pixel data in an $i^{th}$ display row of the display rows into the memory blocks in the order of data storage, and writing N dummy data into the memory blocks in the order of data storage to form an isolated block;
writing M dummy data into the memory blocks after the isolated block in the order of data storage to form a first shifted block; and
writing a plurality of second pixel data in an $(i+1)^{th}$ display row of the display rows into the memory blocks after the first shifted block in the order of data storage, and writing O dummy data into the memory blocks in the order of data storage to form a second shifted block.

2. The memory access method as claimed in claim 1, wherein the image data is a monochromatic image data.

3. The memory access method as claimed in claim 1, wherein i, O, and M are positive integers, and N=M+O.

4. The memory access method as claimed in claim 1, further comprising:
when an interpolation is performed to generate a specific pixel data,
calculating a plurality of addresses of a plurality of adjacent pixel data of the specific pixel data, the addresses being in each of the memory blocks; and
accessing the inner memories based on the addresses to read the adjacent pixel data.

5. The memory access method as claimed in claim 4, further comprising:
performing the interpolation based on the adjacent pixel data read from the inner memories.

6. The memory access method as claimed in claim 4, wherein the interpolation is bilinear interpolation.

7. A memory access method for processing images, the memory access method comprising:
reading an image data from a main memory, the image data having a plurality of display rows;
configuring a plurality of inner memories to be a plurality of memory blocks arranged in an order of data storage;
writing a plurality of first and second pixel data in an $i^{th}$ display row and an $(i+1)^{th}$ display row of the display rows into the memory blocks in the order of data storage, inserting N dummy data between the first and second pixel data in the $i^{th}$ display row and the $(i+1)^{th}$ display row, and writing N dummy data into the memory blocks after the second pixel data in the order of data storage to form an isolated block; and
writing a plurality of third and fourth pixel data in an $(i+3)^{th}$ display row and an $(i+4)^{th}$ display row of the display rows into the memory blocks in the order of data storage, wherein M dummy data are inserted between the isolated block and the third pixel data, (M+O) dummy data are inserted between the third pixel data and the fourth pixel data to form a shifted block, and O dummy data are written into the memory blocks after the shifted block in the order of data storage.

8. The memory access method as claimed in claim 7, wherein the image data is a color image data.

9. The memory access method as claimed in claim 7, wherein i is a positive integer divided by four with a remainder of 1, O and M are positive integers, and N=M+O.

10. An image processing apparatus comprising:
a bus arbiter;
a plurality of inner memories coupled to the bus arbiter;
a main memory controller coupled between the bus arbiter and a main memory; and
a controller coupled to the bus arbiter and reading an image data from the main memory through the bus arbiter, the image data having a plurality of display rows, the controller configuring the inner memories to be a plurality of memory blocks arranged in an order of data storage, the controller writing a plurality of first pixel data in an $i^{th}$ display row of the display rows into the memory blocks in the order of data storage and writing N dummy data into the memory blocks in the order of data storage to form an isolated block, the controller writing M dummy data into the memory blocks after the isolated block in the order of data storage to form a first shifted block, the controller writing a plurality of second pixel data in an $(i+1)^{the}$ display row of the display rows into the memory blocks after the first shifted block in the order of data storage, the controller writing O dummy data in the order of data storage to form a second shifted block.

11. The image processing apparatus as claimed in claim 10, wherein i is an odd number or an even number, O and M are positive integers, and N=M+O.

12. The image processing apparatus as claimed in claim 10, wherein when the controller performs an interpolation to generate a specific pixel data, the controller calculates a plurality of addresses of a plurality of adjacent pixel data of the specific pixel data in each of the memory blocks and accesses the inner memories simultaneously based on the addresses to read the adjacent pixel data.

13. The image processing apparatus as claimed in claim 12, wherein the controller further performs the interpolation based on the adjacent pixel data read from the inner memories.

14. An image processing apparatus comprising:
a bus arbiter;
a plurality of inner memories coupled to the bus arbiter;
a main memory controller coupled between the bus arbiter and a main memory; and
a controller coupled to the bus arbiter and reading an image data from the main memory through the bus arbiter, the image data having a plurality of display rows, the controller configuring the inner memories to be a plurality of memory blocks arranged in an order of data storage, the controller writing a plurality of first and second pixel data respectively in an $i^{th}$ display row and an $(i+1)^{th}$ display row of the display rows into the memory blocks in the order of data storage, inserting N dummy data between the first and second pixel data in the $i^{th}$ display row and the $(i+1)^{th}$ display row, and writing N dummy data into the memory blocks after the second pixel data in the order of data storage to form an isolated block, the controller further writing a plurality of third and fourth pixel data respectively in an $(i+3)^{th}$ display row and an $(i+4)^{th}$ display row of the display rows into the memory blocks in the order of data storage, wherein M dummy data are inserted between the isolated block and the third pixel data, (M+O) dummy data are inserted between the third pixel data and the fourth pixel data to form a shifted block, and O dummy data are written into the memory blocks after the shifted block in the order of data storage.

15. The image processing apparatus as claimed in claim 14, wherein i is a positive integer divided by four with a remainder of 1, O and M are positive integers, and N=M+O.

* * * * *